US012552054B2

(12) United States Patent
Keel et al.

(10) Patent No.: US 12,552,054 B2
(45) Date of Patent: Feb. 17, 2026

(54) ASSISTED OPENING AND CLOSING KNIFE WITH LOCK

(71) Applicant: KAI U.S.A., LTD., Tualatin, OR (US)

(72) Inventors: Andrew Russell Keel, Portland, OR (US); James Duncan MacNair, Newberg, OR (US)

(73) Assignee: KAI U.S.A., LTD., Tualatin, OR (US)

( * ) Notice: Subject to any disclaimer, the term of this patent is extended or adjusted under 35 U.S.C. 154(b) by 156 days.

(21) Appl. No.: 18/480,010

(22) Filed: Oct. 3, 2023

(65) Prior Publication Data

US 2025/0108526 A1 Apr. 3, 2025

(51) Int. Cl.
*B26B 1/04* (2006.01)

(52) U.S. Cl.
CPC .............. *B26B 1/048* (2013.01); *B26B 1/044* (2013.01)

(58) Field of Classification Search
CPC .. B26B 1/02; B26B 1/04; B26B 1/046; B26B 1/048
See application file for complete search history.

(56) References Cited

U.S. PATENT DOCUMENTS

| | | | |
|---|---|---|---|
| 5,737,841 A | 4/1998 | McHenry et al. | |
| 6,145,202 A | 11/2000 | Onion | |
| 6,338,431 B1 | 1/2002 | Onion | |
| 6,378,214 B1 | 4/2002 | Onion | |
| 6,397,476 B1 | 6/2002 | Onion | |
| 6,427,334 B2 | 8/2002 | Onion | |
| 6,591,504 B2 | 7/2003 | Onion | |
| 7,296,355 B2 | 11/2007 | Onion | |
| 7,340,838 B2 | 3/2008 | Onion | |
| 7,370,421 B2 | 5/2008 | Onion et al. | |
| 7,395,599 B2 | 7/2008 | Onion | |
| 7,458,159 B2 | 12/2008 | Galyean et al. | |
| 7,506,446 B2 | 3/2009 | Onion | |
| 7,716,839 B2 | 5/2010 | Onion et al. | |
| 7,774,939 B1 | 8/2010 | Onion | |
| RE42,906 E | 11/2011 | Onion | |
| 9,079,320 B2 | 7/2015 | Onion | |
| 2004/0123471 A1 | 7/2004 | Onion | |
| 2005/0097755 A1 | 5/2005 | Galyean et al. | |
| 2007/0068002 A1 | 3/2007 | Onion | |
| 2008/0155833 A1 * | 7/2008 | Busse | B26B 1/048 30/161 |

(Continued)

*Primary Examiner* — Evan H MacFarlane
(74) *Attorney, Agent, or Firm* — Seed Intellectual Property Law Group LLP

(57) ABSTRACT

A knife includes a handle and a blade that is rotatably coupled to the handle. A locking assembly is provided and includes a lock pin, an omega spring, and a transfer bar coupled between the lock pin and the omega spring for biasing the lock pin into a locking position to lock the knife closed or open. The locking assembly may further include a supplemental omega spring on an opposing side of the knife to further assist in biasing the lock pin into the locking position. A torsion bar is also provided within the handle to provide assisted opening functionality. The transfer bar extends at least partially through the handle to locate the omega spring in the handle offset from the torsion bar. The locking assembly assists with holding the blade in the open and closed positions, while the torsion bar aids in assisted opening and closing of the blade.

18 Claims, 4 Drawing Sheets

(56) References Cited

U.S. PATENT DOCUMENTS

| | | | | |
|---|---|---|---|---|
| 2008/0222896 | A1* | 9/2008 | Marfione | B26B 5/00 30/160 |
| 2014/0115898 | A1* | 5/2014 | Collins | B26B 1/044 30/159 |
| 2015/0352731 | A1* | 12/2015 | France | B26B 1/048 30/159 |
| 2018/0099423 | A1* | 4/2018 | Mundhra | B26B 1/044 |
| 2019/0184584 | A1* | 6/2019 | Duey | B25F 1/04 |
| 2020/0001476 | A1* | 1/2020 | Allen | B26B 1/048 |
| 2022/0410415 | A1* | 12/2022 | Douglas | B26B 1/048 |
| 2023/0126401 | A1* | 4/2023 | Shimanoff | B26B 1/04 30/159 |
| 2024/0017429 | A1* | 1/2024 | Wu | B26B 1/042 |

* cited by examiner

ASSISTED OPENING AND CLOSING KNIFE WITH LOCK

BACKGROUND

Technical Field

The present disclosure is generally directed to a knife, and more particularly, but not exclusively to a knife with a combination of locking and assisted opening and closing functionality.

Description of the Related Art

Knives are generally known. One example of a known knife is a folding knife that may generally include a handle and a blade rotatably coupled to the handle. The blade rotates from a closed or storage position with a sharp edge of the blade received and stored securely inside the handle to an open or use position with the blade extending from the handle and a sharp edge of the blade exposed. Over the years, certain problems were exposed with conventional folding knife designs, such as the knives being difficult to open and close as well as a tendency for the blade in the open position to unintentionally return to the closed position during use, among others. Such problems pose significant safety concerns for use of conventional folding knife designs given the sharp edge on the blade and the overall movement of the knife.

In response, designs have been proposed to assist with opening and closing knives. Separate designs also contemplate a lock for holding the blade in the closed or open positions. Both of these proposed solutions have typically employed structures or assemblies that interact with a tang of the knife, or where the knife is rotatably coupled to the handle and are therefore implemented in the knife handle at a location close to where the blade meets the handle. The size and space constraints of the handle lead to challenges in attempting to combine these solutions into a single knife. For example, either of the above solutions may utilize most of the available space near the tang of the knife, leaving no space for the other solution to be implemented. The natural result of these challenges is that most folding knives do not implement both advantageous solutions, or where they are both implemented, they are done so in a way that poses safety and/or durability concerns and in a manner that is not practical for wide application in a variety of different sizes of knives. For example, past attempts to combine both assisted opening and closing with a locking feature may require a larger area around the tang, which increases the overall size of the handle, or an increased thickness of the knife handle. There are other deficiencies as well.

Accordingly, it would be advantageous to have a knife that overcomes the deficiencies and disadvantages of known knives.

BRIEF SUMMARY

One embodiment of a knife may be summarized as including: a handle; a blade rotatably coupled to the handle and manipulatable between a closed position and an open position; a torsion bar configured to provide assisted opening of the blade from the closed position to the open position; and a locking assembly including a user-manipulable lock pin, an omega spring, and a transfer bar coupled between the lock pin and the omega spring, the lock pin being movable between a locked position and an unlocked position, and the omega spring biasing the lock pin toward the locked position via the transfer bar.

The omega spring may be provided in the handle in a position that is offset longitudinally from the torsion bar. The handle may include one or more internal pockets and each of the torsion bar, the transfer bar and the omega spring may be positioned within the one or more internal pockets. The locking assembly may further comprise a supplemental omega spring located on an opposing side of the handle, wherein the omega springs collectively bias the lock pin toward the locked position. The handle may include an internal pocket and a divider having a divider base and a divider arm, the divider base separating the internal pocket into a proximal portion accommodating the torsion bar and a distal portion accommodating the omega spring, and the divider arm defining a transfer portion extending between the proximal portion and the distal portion, the divider arm further configured to guide longitudinal movement of the transfer bar during user-manipulation of the lock pin between the locked position and the unlocked position. A position of one end of the torsion bar may be bounded at least in part by a surface of the divider base and a surface of the divider arm. Unloading of the omega spring may be limited, at least in part, by a surface of the divider base. One end of the transfer bar may engage the lock pin and an opposing end of the transfer bar may engage the omega spring. The transfer bar may include a main body and a foot oriented at a transverse angle to the main body, the foot being located at the opposing end of the transfer bar that engages the omega spring. An end of the torsion bar may be coupled to the blade to move along an arcuate path, and the torsion bar may be configured to assist with opening and closing the blade dependent on a position of the end of the torsion bar along the arcuate path.

Another embodiment of a knife may be summarized as including: a handle; a blade rotatably coupled to the handle and manipulatable between a closed position and an open position; a locking assembly including an omega spring that is configured to apply a biasing force to assist in locking the blade in the closed position or the open position; and a torsion bar configured to provide assisted opening of the blade from the closed position to the open position, wherein the omega spring is positioned in the handle at a location that is offset longitudinally from the torsion bar.

The omega spring may be positioned on one side of the knife, and the locking assembly may include a supplemental omega spring that is positioned on an opposing side of the knife. The supplemental omega spring may be positioned in the handle at a location that is offset longitudinally from the other omega spring. The handle may include an internal pocket and a divider extending at least partially through the internal pocket to separate the internal pocket into a proximal portion and a distal portion, the torsion bar being received in the proximal portion of the internal pocket and the omega spring being received in the distal portion of the internal pocket with the divider therebetween. The locking assembly may further include a user-manipulable lock pin and a transfer bar coupled between the lock pin and the omega spring, the transfer bar extending beyond the torsion bar to interact with the omega spring at a location closer to the distal end of the handle than the torsion bar. The lock pin may be movable between a locked position and an unlocked position, and the omega spring may bias the lock pin toward the locked position via the transfer bar. The handle may include an internal pocket and a divider extending at least partially through the internal pocket, the divider having an arm that at least partially defines a guide channel for guiding movement of the transfer bar. An end of the torsion bar may be coupled to the blade to move along an arcuate path and may be configured to assist with closing the blade until the end of the torsion bar reaches an inflection point, and may be further configured to assist with opening the blade when the end of the torsion bar is past the inflection point.

Yet another embodiment of a knife may be summarized as including: a handle; a blade rotatably coupled to the handle and manipulatable between a closed position and an open position; a locking assembly including a lock pin, an omega spring and a transfer bar coupled between the lock pin and the omega spring on one side of the knife; and a torsion bar configured to provide assisted opening of the blade from the closed position to the open position, wherein the transfer bar extends longitudinally beyond the torsion bar to interact with the omega spring in a location aft the torsion bar.

The omega spring may be located closer to a distal end of the handle than the torsion bar. The locking assembly may further include a supplemental omega spring on an opposing side of the knife that is located closer to a pivot axis of the blade than the other omega spring. The handle may include a divider between the torsion bar and the omega spring. The handle may include an internal pocket and the divider may separate the internal pocket into a proximal portion, a distal portion, and a transfer portion extending between and in communication with both the proximal portion and the distal portion, the torsion bar being received in the proximal portion of the internal pocket and the omega spring being received in the distal portion of the internal pocket, and the transfer bar extending through the transfer portion with movement of the transfer bar guided, at least in part, by the divider. One end of the transfer bar may engage the lock pin and an opposite end that terminates in a foot that is angled with respect to a body of the transfer bar may engage the omega spring.

DETAILED DESCRIPTION

Figure 1:
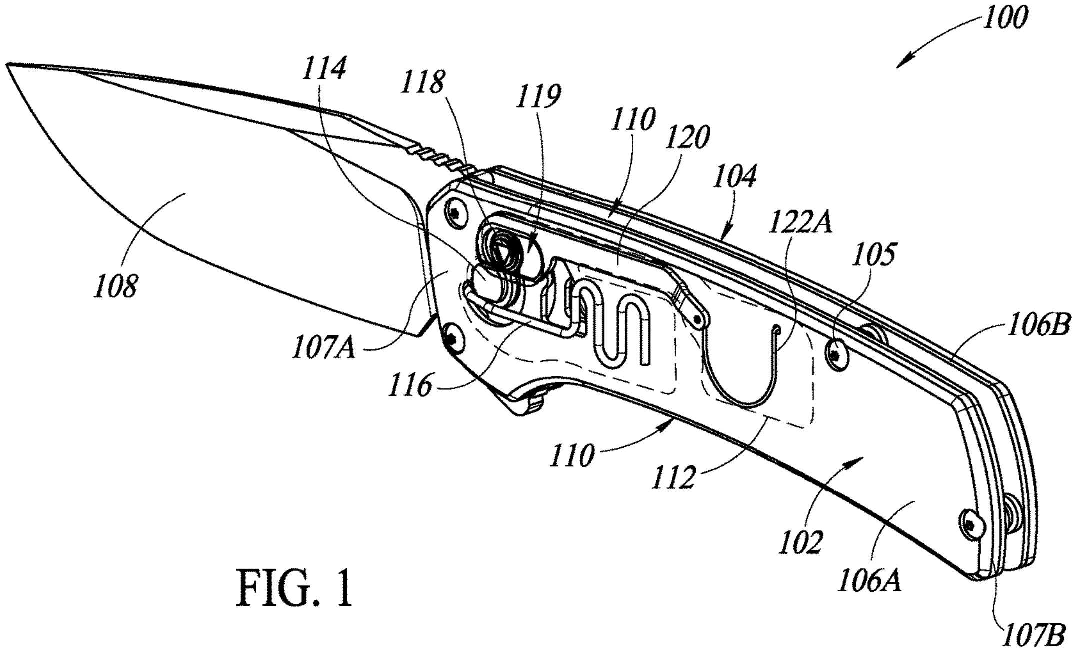
FIG. 1 is a perspective view of a knife having a torsion bar, a lock, a transfer bar, and an omega spring in an open position according to one or more embodiments of the present disclosure.
Figure 2:
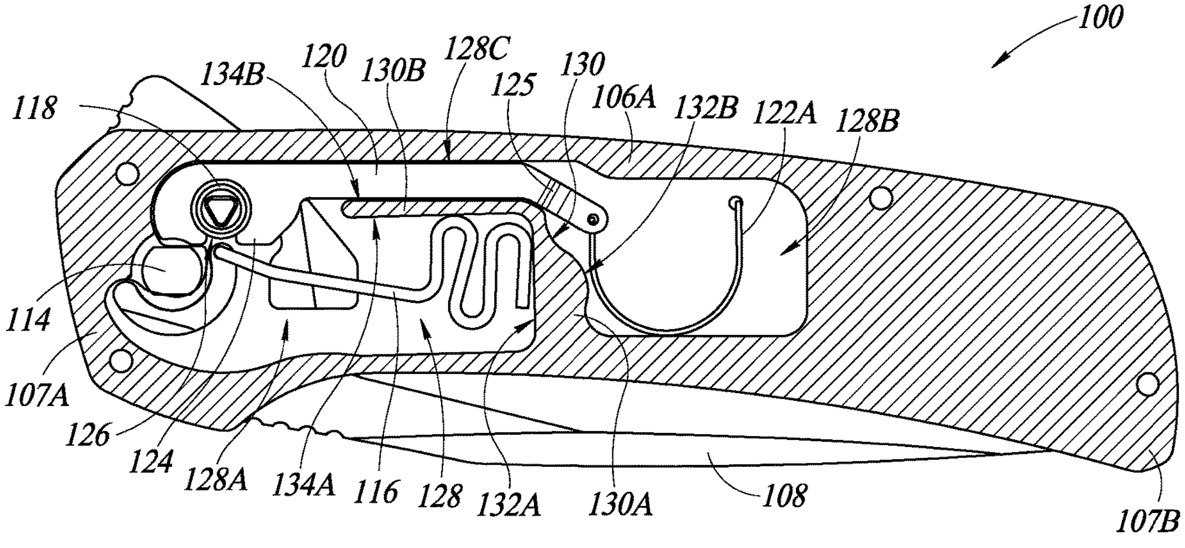
FIG. 2 is a cross-sectional view of the knife of FIG. 1 in a closed position.

FIG. 1 is an isometric view of a knife 100 in an open position and FIG. 2 is a cross-sectional view of the knife 100 in a closed position. The knife 100 has a first side 102 that is illustrated in FIG. 1 and a second side 104 opposite to the first side 102 that is discussed in more detail with reference to FIG. 8. FIG. 2 is a cross-sectional view of the first side 102 of the knife 100. With reference to FIG. 1 and FIG. 2, the knife 100 includes first and second liners 106A, 106B (which may also be referred to herein as spacers 106A, 106B or more generally as a handle or handle components) that are coupled to each other, such as with fasteners 105, and a blade 108 rotatably coupled to the liners 106A, 106B. The liners 106A, 106B include a proximal end 107A and a distal end 107B arranged at opposite longitudinal or lengthwise ends of the liners 106A, 106B. The proximal end 107A is proximate to, or closest to, where the liners 106A. 106B interface with the blade 108 (e.g., at the blade pivot) while the distal end 107B is furthest from the interface between the blade 108 and the liners 106A, 106B in the open position of the knife 100. The liners 106A, 106B define a space or channel 110 therebetween to receive the blade 108 in the closed position, as shown in FIG. 2. The knife 100 may also include an outer plate or housing that is not illustrated in FIG. 1 and FIG. 2 to avoid obscuring the concepts of the disclosure.

However, such housing may have a pocket with a shape that corresponds to the dashed outline 112 in FIG. 1 for receiving and covering the features of the knife 100 discussed herein. Except as otherwise indicated below, the features discussed herein are therefore internal to the handle of the knife 100.

The blade 108 is rotatably coupled to the liners 106A, 106B with a pivot bar 114 extending through the liners 106A, 106B and the blade 108, which also defines a blade pivot axis. The torsion bar 116 may be implemented as a biasing element that assists with opening and closing the blade 108, as further described herein. The knife 100 further includes a sliding lock pin 118 that is at least partially exposed through an aperture 119 in the first liner 106A (and a similar aperture in the outer housing of the knife or handle such that the sliding lock pin 118 is manipulatable by a user) to enable a user to slide the lock pin 118 along the aperture 119. The boundaries of the first liner 106A that define the aperture 119 also serve as a guide for movement of the lock pin 118. In an embodiment, the aperture 119 extends in a longitudinal direction of the liner 106A (i.e., from the proximal end 107A toward the distal end 107B) with a height that generally corresponds to a height of the lock pin 118 or a dowel of the lock pin 118 to guide movement of the lock pin 118 in a longitudinal direction of the first liner 106A while preventing movement of the lock pin 118 in a lateral direction (i.e., up and down in the orientation of FIG. 1 and FIG. 2).

A transfer bar 120 is coupled to and between the sliding lock pin 118 and an omega spring 122A, with the sliding lock pin 118, the transfer bar 120, and the omega spring 122A collectively forming a locking assembly. More specifically, the transfer bar 120 has prongs 124 that define a slot 126 that engages the lock pin 118. In some embodiments, the lock pin 118 includes a dowel with a size and shape that corresponds to the slot 126 for engagement with the prongs 124, although the same is not necessarily required. The prongs 124 taper to a generally straight and rectilinear body of the transfer bar 120 that extends longitudinally from the prongs 124 and tapers further to terminate at a foot 125. The foot 125 may be angled relative to the body of the transfer bar 120 to assist with engaging and manipulating the omega spring 122A. In an embodiment, the foot 125 is angled between and excluding 0 degrees and 90 degrees relative to a midline through the body of the transfer bar 120, and more preferably between 15 degrees and 75 degrees, and more preferably between 30 degrees and 45 degrees. In some embodiments, the body of the transfer bar 120 remains straight to the connection with the omega spring 122A.

As best shown in FIG. 2, the torsion bar 116, transfer bar 120, and omega spring 122A are received in an internal pocket 128 in the first liner 106A. The internal pocket 128 includes a proximal portion 128A in communication with a distal portion 128B through a transfer portion 128C. The proximal portion 128A is located close to, or at, the proximal end 107A of the first liner 106A and receives the torsion bar 116. The distal portion 128B is located closer to the distal end 107B of the first liner 106A than the proximal portion 128A and receives a portion of the transfer bar 120 and the omega spring 122A. The transfer portion 128C extends between the proximal and distal portions 128A, 128C and receives a majority of the transfer bar 120 with the transfer bar 120 generally positioned above the torsion bar 116 and the omega spring 122A in the orientation of FIG. 2. In an embodiment, the first liner 106A includes a divider 130 with a divider base 130A connected to a divider arm 130B as a single, unitary, integral component. In further embodiments, the divider base 130A and divider arm 130B may be separate components coupled together by fasteners and the like. The divider base 130A has a thickness that may be greater than a thickness of the divider arm 130B with the divider arm 130B being substantially perpendicular to the divider base 130B. The divider base 130A may be positioned proximate a center of the first liner 106A or slightly closer to the proximal end 107A than the distal end 107B of the first liner 106A with the divider arm 130A extending toward the proximal end 107A of the first liner 106A. Each of the base 130A and the arm 130B assist with separating the various portions 128A-128C of the internal pocket 128 and also provide surfaces that various features of the knife 100 act against to perform the functions described herein.

For example, the torsion bar 116 acts against one or more of a proximal surface 132A of the divider base 130A and a proximal surface 134A of the divider arm 130B. The proximal surfaces 132A, 134A may also limit motion of the torsion bar 116. A distal surface 132B of the divider base 130A may serve as a limit to prevent further movement of the omega spring 122A beyond an intended range of motion. A distal surface 134B of the divider arm 130B provides a boundary for the transfer portion 128C of the pocket 128 that serves as a guide for motion of the transfer bar 120. The transfer portion 128C of the pocket 128, as defined by the upper boundary of the first liner 106A and the lower boundary of the distal surface 134B of the divider arm 130B, extends longitudinally with the distal surface 134B of the divider arm 130A providing a boundary surface that enables and guides longitudinal movement of the transfer bar 120, but prevents lateral movement (i.e., up and down in the orientation of FIG. 2) of the transfer bar 120. In other words, the transfer portion 128C is implemented as a guide channel by the first liner 106A and the divider arm 130B to guide and control longitudinal movement of the transfer bar 120. As a result, the torsion bar 116 may be proximate to where the blade 108 interfaces with the liners 106A, 106B (i.e., at the proximal end 107A) in order to provide the opening and closing assistance functionality described herein, while the omega spring 122A is positioned in a distal portion of the first liner 106A (i.e., closer to the distal end 107B than the proximal end 107A) to assist with the locking functionality described herein. Positioning the torsion bar 116 and omega spring 122A in different areas of the handle (i.e., first liner 106A) enables a combination of opening and closing assistance and locking functionality in the knife 100 in a manner that improves reliability and safety while avoiding increasing or otherwise changing the outer dimensions of the handle, among other advantages.

FIGS. 3-6 are cross-sectional views of the first side 102 of the knife 100 illustrating operation of the knife 100 from the closed position shown in FIG. 2 to the open position in FIG. 1. Beginning with FIG. 3, and with continuing reference to FIG. 1 and FIG. 2, the knife 100 is initially in the closed position with at least a portion of, or a majority of, the blade 108 received in the channel 110 (FIG. 1) between the liners 106A, 106B. The blade 108 is initially secured in the closed position and prevented from opening by the sliding lock pin 118 being in a locked position, meaning that the lock pin 118 prevents rotation of the blade 108 in the locked position of the pin 118. In the locked position of the lock pin 118, a portion of the lock pin 118 may interact with a tang portion of the blade 108 to obstruct the tang from rotating about the blade pivot axis, and thus prevent rotation of the blade 108. Further details of this interaction are not described further to avoid obscuring the concepts of the disclosure.

Figure 3:
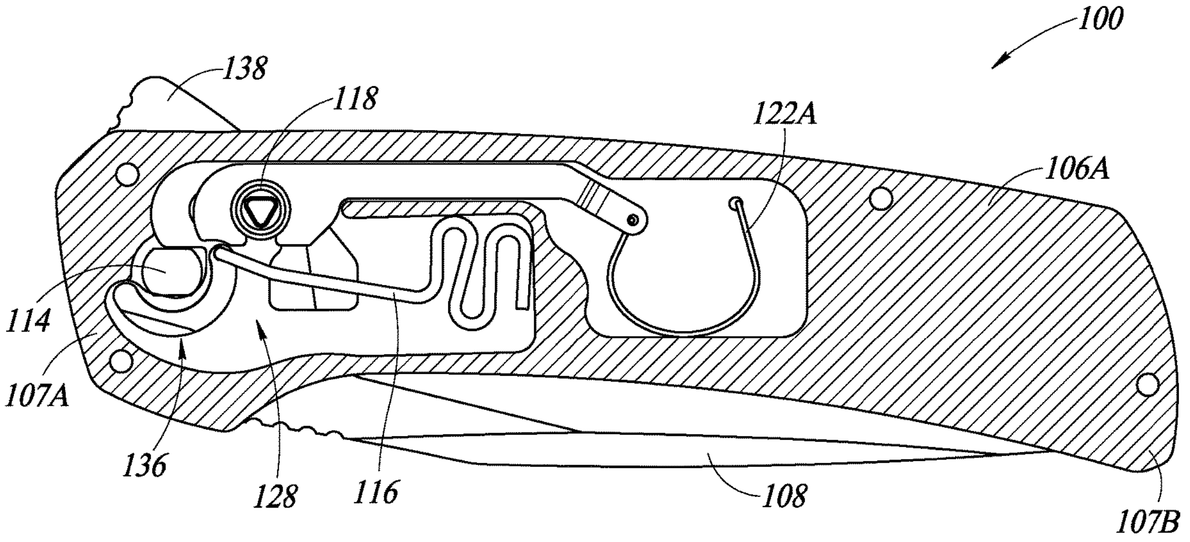
FIGS. 3-6 are cross-sectional views of the knife of FIG. 1 illustrating an opening operation of the knife from the closed position (FIG. 3) to the open position (FIG. 6).

To initiate the opening procedure, and as shown in FIG. 3, the user applies force to the sliding lock pin 118 to bias or move the pin 118 toward the distal end 107B of the first liner 106A along aperture 119. Such movement of the pin 118 is transferred to the omega spring 122A by the transfer bar 120, with the omega spring 122A initially compressing and providing a corresponding resistive force to movement of the pin 118. The resistive force from the omega spring 122A is helpful to prevent unintended opening of the blade 108. Once the lock pin 118 is moved to a distal end of the aperture 119 (i.e., the unlocked position of the pin 118 illustrated in FIG. 3), the tang of the blade is no longer obstructed by the locking pin 118 from rotating about the blade pivot axis and thus enables rotation of the blade 108. It is also important to note that when the pin 118 is moved to the unlocked position, the torsion bar 116 also assists with holding the blade 108 in the closed position to further prevent unintended opening of the blade 108. The torsion bar 116 is coupled to the blade 108 with movement of the torsion bar 116 guided along an arcuate slot 136 in the first liner 106A. In the closed position of the blade 108, the connection between the torsion bar 116 and the blade 108 is beyond an inflection point in the movement of the bar 116 along the slot 136 such that the torsion bar 116 biases the blade 108 into the closed position. The operation of the torsion bar 116 and the inflection point will be described in more detail below.

Figure 4:
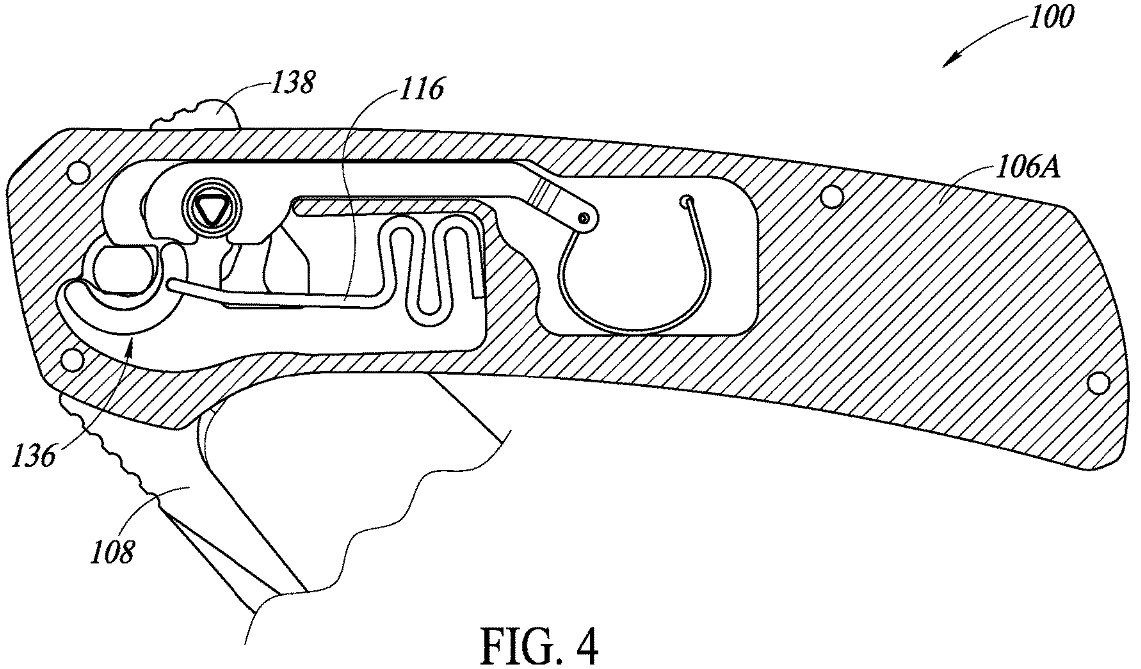

Turning to FIG. 4, with continuing reference to FIGS. 1-3, once the lock pin 118 is in the unlocked position, the user can manipulate a flipper 138 on the backside of the blade 108 (i.e., press down on the flipper 138 with an index finger or otherwise) to initiate the opening of the blade 108. As the blade 108 begins to extend out of the first liner 106A (and handle generally), an end of the torsion bar 116 begins to rotate with the blade 108 along the arcuate slot 136. In the position of the torsion bar 116 in FIG. 4, the torsion bar 116 applies a force that is generally aligned with the pivot axis such that the torsion bar 116 has reached an inflection point where it transitions from holding the blade 108 closed to assisting the blade 108 in opening. In other words, at the initial stage of opening the blade 108, the torsion bar 116 does not provide assisted opening, but rather, biases the blade 108 back toward the housing and first liner 106A for additional safety. Once past the inflection point, as illustrated in FIG. 4, the torsion bar 116 transitions to providing assisted opening of the blade 106. The inflection point may correspond to approximately 20% to 40% of a maximum range of travel of the torsion bar 116 along the slot 136 in some embodiments. As shown in FIG. 4, the inflection point may also correspond to the blade 108 having completed approximately 25 to 35% of its range of rotation (i.e., roughly one-quarter or one-third between the closed position and the open position of the knife 100).

Figure 5:
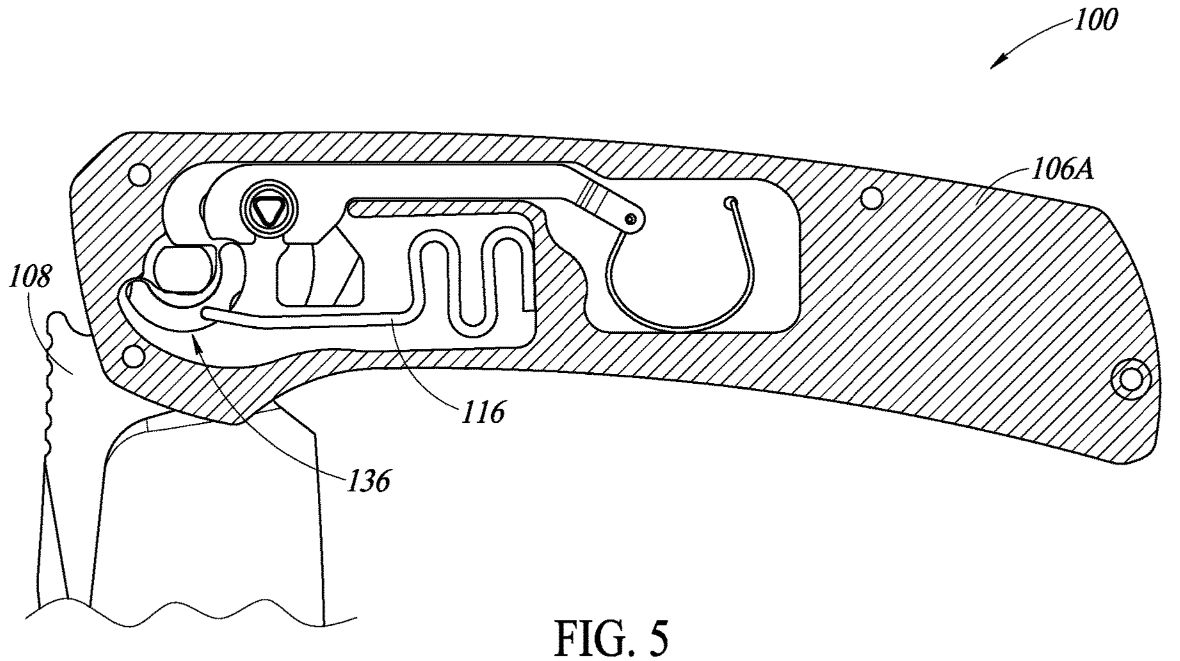

FIG. 5 illustrates the torsion bar 116 beyond the inflection point in its travel along the arcuate slot 136. Again, when the torsion bar 116 reaches the inflection point, the torsion bar 116 transitions from applying a force to draw the blade 108 back toward the first liner 106A to releasing force stored in the torsion bar 116 to assist with opening the blade 108. As such, when the torsion bar 116 is past the inflection point, the torsion bar 116 extends and applies force to the blade 108 to assist with opening the blade 118 rather than biasing the blade 108 toward the closed position. Throughout the opening procedure described with reference to FIGS. 3-5, the sliding lock pin 118 may remain in the unlocked position under manipulation from the user to prevent the lock pin 118 from interfering with rotation of the blade 108. If released, the lock pin 118 may also ride on a surface of a tang of the blade 106 until the blade 106 reaches an open position where the lock pin 118 may be moved back into a locked position.

Figure 6:
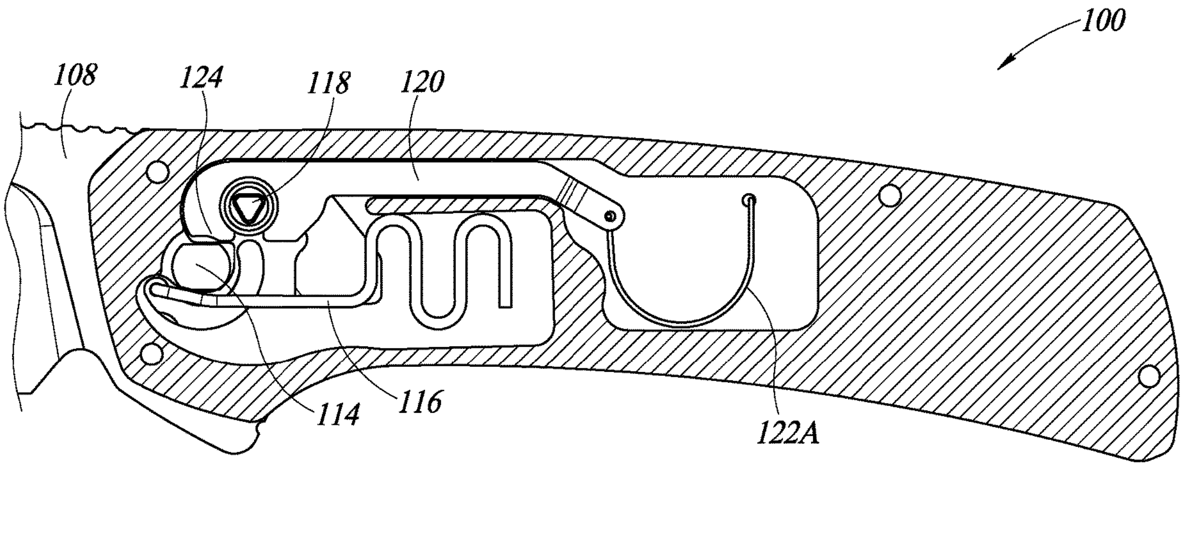

FIG. 6 illustrates the knife 100 in the open position. In the open position, the blade 108 has completed its rotation and is fully extended from the first liner 106A (or handle). The user then releases the sliding lock pin 118 (if not already released) and the omega spring 122A biases the sliding lock pin 118 in a proximal direction of the aperture 119 to return the lock pin 118 to the locked position. In this position, the lock pin 118 once again interacts with the tang of the blade 108 to prevent rotation of the blade 108. Thus, the lock pin 118 and transfer bar 120 also assist with holding the blade 108 in the open position. The blade 108 may also, in some embodiments, be held in the open position, at least in part, by a force exerted by the torsion bar 116. In other instances, the torsion bar 116 may be fully expanded and have a floating free end such that the torsion bar 116 no longer applies a force to the blade 106.

Figure 7:
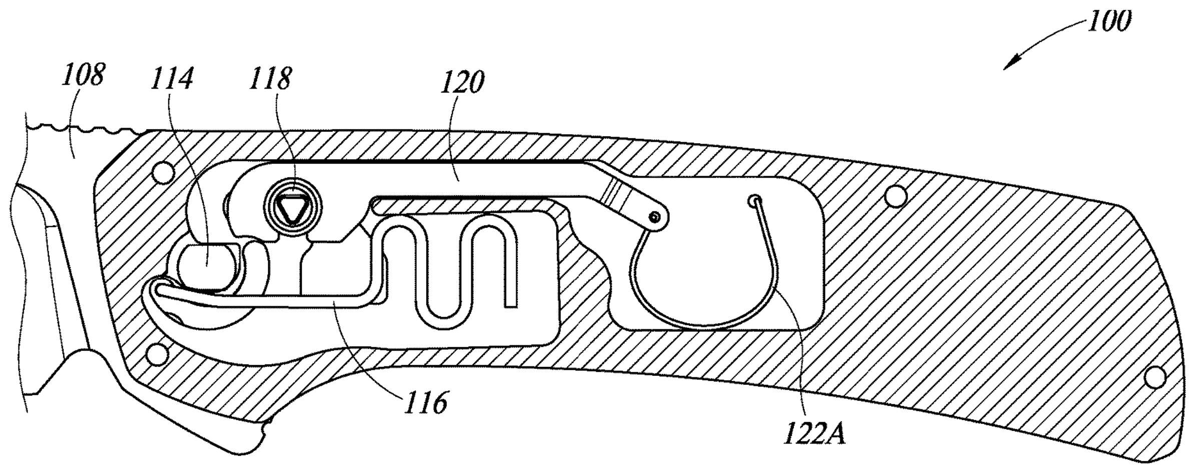
FIG. 7 is a cross-sectional view of the knife of FIG. 1 illustrating operation of the lock to enable the knife to be manipulated from the open position to the closed position.

FIG. 7 is a cross-sectional view of the knife 100 illustrating operation of the sliding lock pin 118 in preparation to move the knife 100 from the open position to the closed position. To return the knife 100 from the open position of FIG. 6 back to the closed position of FIG. 2, the above steps are generally repeated in reverse. In sum, the user first manipulates the sliding lock pin 118 in a distal direction of the aperture 119 to move the lock pin 118 to the unlocked position described above and enable rotation of the blade 108. The movement of the lock pin 118 loads the omega spring 122A via the transfer bar 120. As the user initially attempts to rotate the blade 108 back toward the closed position, the torsion bar 116 may provide a force to hold the blade 108 open to avoid accidental closing. Once the torsion bar 116 passes the inflection point shown in FIG. 5, the torsion bar 116 assists with closing the blade 108 and holding the blade 108 closed. Once the blade 108 and the knife 100 are in closed position shown in FIG. 2 (or in an intermediate position), the user releases the sliding lock pin 118 and the omega spring 122A manipulates the pin 118 back to the locked position once the blade is in the closed position to lock the blade 108 in the closed position.

Additional detail regarding aspects of the structure and function of the sliding lock pin 118 and the torsion bar 116, among other features, can be found in U.S. Pat. No. 5,737,841 issued on Apr. 14, 1998 and U.S. Pat. No. 6,145,202 issued on Nov. 14, 2000, both of which are incorporated herein by reference in their entirety.

Figure 8:
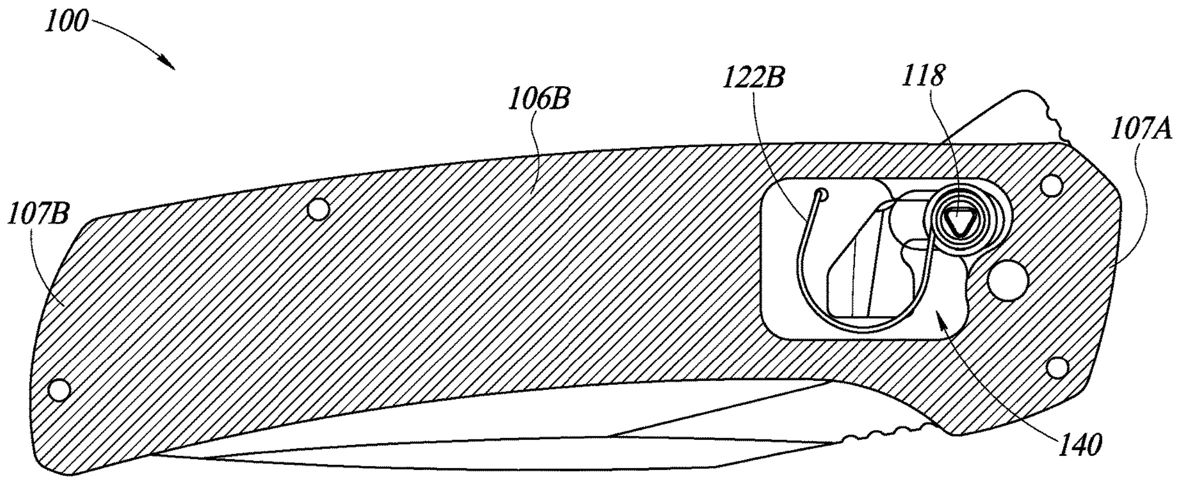
FIG. 8 is a cross-sectional view of another side of the knife of FIG. 1.

FIG. 8 is a cross-sectional view of an opposing side of the knife 100 and the second liner 106B. The second liner 106B may include an internal pocket 140 that receives a second omega spring 122B coupled to the sliding lock pin 118. The interaction of the sliding lock pin 118 and the second omega spring 122B may be similar to that of the sliding lock pin 118 and the first omega spring 122A, except as otherwise noted below, and may form part of the aforementioned locking assembly. In an embodiment, the sliding lock pin 118 is connected through the liners 106A, 106B, to be exposed on opposite sides of the knife 100. The second omega spring 122B provides balance to movement of the lock pin 118 on either side of the knife 100 by providing a similar force on the lock pin 118 as the first omega spring 122A. The opposing side of the knife 100 may exclude the torsion bar 116 in some embodiments, such that there are less space constraints on the opposing side of the knife 100. As a result, the second omega spring 122B and the internal pocket 140 may be positioned proximate to, or at, the proximal end 107A of the second liner 106B. In an embodiment, the position and arrangement of the second omega spring 122B and the internal pocket may mirror that of the first omega spring 122A (i.e., the second omega spring 122B is positioned proximate a center of the knife 100 or closer to the distal end 107B of the second liner 106B) for further symmetry and balance. In such an example, the lock spring 118 and second omega spring 122B may be connected by another transfer bar 120. The sliding lock pin 118 and second omega spring 122B also assist with locking the knife and/or blade 108 in the open and closed positions, as described above.

Thus, in sum, the knife 100 has locking assistance features (i.e., lock pin(s) 118, 118 and corresponding omega springs 122A, 122B on the first and second sides of the knife 100) as well as assisted opening and closing features (i.e., torsion bar 116) on at least the first side of the knife 100. In an embodiment, the knife 100 may also include the torsion bar 116 on only the first side of the knife 100, or on both the first and second sides. One or more transfer bars 120 are provided to transfer force from one or both of the omega springs 122A, 122B to the lock pin(s) 118, 118. The concepts of the disclosure therefore provide a folding knife with a combination of locking functionality in the open and closed positions, as well as opening and closing assistance functionality. These solutions are contemplated in a form factor that is reliable for repeat usage and adaptable to a wide variety of knife handle sizes. Such an arrangement improves safety and durability.

Moreover, aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A knife, comprising:

a handle;

a blade rotatably coupled to the handle and manipulatable between a closed position and an open position;

a torsion bar configured to provide assisted opening of the blade from the closed position to the open position; and a locking assembly including a user-manipulable lock pin, an omega spring, and a transfer bar coupled between the lock pin and the omega spring, the lock pin being movable between a locked position and an unlocked position, and the omega spring biasing the lock pin toward the locked position via the transfer bar, wherein the handle includes an internal pocket and a divider having a divider base and a divider arm, the divider base separating the internal pocket into a proximal portion accommodating the torsion bar and a distal portion accommodating the omega spring, and the divider arm defining a transfer portion extending between the proximal portion and the distal portion, the divider arm further configured to guide longitudinal movement of the transfer bar during user-manipulation of the lock pin between the locked position and the unlocked position.

2. The knife of claim 1 wherein the omega spring is provided in the handle in a position that is offset longitudinally from the torsion bar.

3. The knife of claim 1, wherein the locking assembly further comprises a supplemental omega spring located on an opposing side of the handle, and wherein the omega springs collectively bias the lock pin toward the locked position.

4. The knife of claim 1, wherein a position of one end of the torsion bar is bounded at least in part by a surface of the divider base and a surface of the divider arm.

5. The knife of claim 1, wherein one end of the transfer bar engages the lock pin and an opposing end of the transfer bar engages the omega spring.

6. The knife of claim 5, wherein the transfer bar includes a main body and a foot oriented at a transverse angle to the main body, the foot being located at the opposing end of the transfer bar that engages the omega spring.

7. The knife of claim 5, wherein an end of the torsion bar is coupled to the blade to move along an arcuate path, the torsion bar configured to assist with opening and closing the blade dependent on a position of the end of the torsion bar along the arcuate path.

8. A knife, comprising:

a handle;

a blade rotatably coupled to the handle and manipulatable between a closed position and an open position;

a locking assembly including an omega spring that is configured to apply a biasing force to assist in locking the blade in the closed position or the open position, wherein the omega spring is positioned on one side of the knife, and the locking assembly further including a supplemental omega spring that is positioned on an opposing side of the knife; and a torsion bar configured to provide assisted opening of the blade toward the open position at least during a portion of blade travel, wherein the omega spring is positioned in the handle at a location that is offset longitudinally from the torsion bar, and wherein the supplemental omega spring is positioned in the handle at a location that is offset longitudinally from the omega spring.

9. The knife of claim 8, wherein the locking assembly further includes a user-manipulable lock pin and a transfer bar coupled between the lock pin and the omega spring, the transfer bar extending beyond the torsion bar to interact with the omega spring at a location closer to a distal end of the handle than the torsion bar is to the distal end of the handle.

10. The knife of claim 9, wherein the lock pin is movable between a locked position and an unlocked position, and wherein the omega spring biases the lock pin toward the locked position via the transfer bar.

11. The knife of claim 9, wherein the handle includes an internal pocket and a divider extending at least partially through the internal pocket, the divider includes an arm that at least partially defines a guide channel for guiding movement of the transfer bar.

12. The knife of claim 8, wherein an end of the torsion bar is coupled to the blade to move along an arcuate path and is configured to assist with biasing the blade toward the closed position until the end of the torsion bar reaches an inflection point, and is further configured to assist with opening the blade when the end of the torsion bar is past the inflection point.

13. A knife, comprising:

a handle;

a blade rotatably coupled to the handle and manipulatable between a closed position and an open position;

a locking assembly including an omega spring that is configured to apply a biasing force to assist in locking the blade in the closed position or the open position;

a torsion bar configured to provide assisted opening of the blade toward the open position at least during a portion of blade travel, wherein the omega spring is positioned in the handle at a location that is offset longitudinally from the torsion bar, and wherein the handle includes an internal pocket and a divider extending at least partially through the internal pocket to separate the internal pocket into a proximal portion and a distal portion, the torsion bar being received in the proximal portion of the internal pocket and the omega spring being received in the distal portion of the internal pocket with the divider located between the torsion bar and the omega spring.

14. A knife, comprising:

a handle;

a blade rotatably coupled to the handle and manipulatable between a closed position and an open position;

a locking assembly including a lock pin, an omega spring and a transfer bar coupled between the lock pin and the omega spring on one side of the knife; and a torsion bar configured to provide assisted opening of the blade from the closed position to the open position, wherein the transfer bar extends longitudinally beyond the torsion bar to interact with the omega spring in a location aft the torsion bar, and wherein the locking assembly further includes a supplemental omega spring on an opposing side of the knife, the supplemental omega spring being located closer to a pivot axis of the blade than the omega spring is to the pivot axis of the blade.

15. The knife of claim 14, wherein the omega spring is located closer to a distal end of the handle than the torsion bar is to the distal end of the handle.

16. The knife of claim 14, wherein the handle includes a divider between the torsion bar and the omega spring.

17. The knife of claim 14, wherein one end of the transfer bar engages the lock pin and an opposite end that terminates in a foot that is angled with respect to a body of the transfer bar engages the omega spring.

18. A knife, comprising:

a handle;

a blade rotatably coupled to the handle and manipulatable between a closed position and an open position;

a locking assembly including a lock pin, an omega spring and a transfer bar coupled between the lock pin and the omega spring on one side of the knife; and a torsion bar configured to provide assisted opening of the blade from the closed position to the open position, wherein the transfer bar extends longitudinally beyond the torsion bar to interact with the omega spring in a location aft the torsion bar, and wherein the handle includes an internal pocket and a divider between the torsion bar and the omega spring, and the divider separates the internal pocket into a proximal portion, a distal portion, and a transfer portion extending between and in communication with both the proximal portion and the distal portion, the torsion bar being received in the proximal portion of the internal pocket and the omega spring being received in the distal portion of the internal pocket, and the transfer bar extending through the transfer portion with movement of the transfer bar guided, at least in part, by the divider.

* * * * *